United States Patent
Kollman

(10) Patent No.: US 7,912,743 B2
(45) Date of Patent: Mar. 22, 2011

(54) METHOD FOR SOURCING CUSTOM WINDOW COVERINGS FROM MULTIPLE SOURCES BASED UPON PRICE AND DELIVERY DATE

(75) Inventor: Michael Kollman, Madison, WI (US)

(73) Assignee: Lumino, Inc., Madison, WI (US)

( * ) Notice: Subject to any disclaimer, the term of this patent is extended or adjusted under 35 U.S.C. 154(b) by 1969 days.

(21) Appl. No.: 10/910,885

(22) Filed: Aug. 4, 2004

(65) Prior Publication Data

US 2006/0037817 A1 Feb. 23, 2006

(51) Int. Cl.
*G06F 9/44* (2006.01)
(52) U.S. Cl. .................. 705/7; 705/10; 705/26
(58) Field of Classification Search .......... 705/7
See application file for complete search history.

(56) References Cited

U.S. PATENT DOCUMENTS

| | | | | | |
|---|---|---|---|---|---|
| 5,450,317 | A | * | 9/1995 | Lu et al. | 705/10 |
| 5,991,728 | A | * | 11/1999 | DeBusk et al. | 705/2 |
| 6,148,894 | A | * | 11/2000 | Judkins | 160/177 R |
| 6,823,926 | B1 | * | 11/2004 | Tyner | 160/178.2 |
| 6,899,156 | B2 | * | 5/2005 | Tyner | 160/178.1 R |
| 6,912,502 | B1 | * | 6/2005 | Buddle et al. | 705/10 |
| 6,938,021 | B2 | * | 8/2005 | Shear et al. | 705/67 |
| 6,954,734 | B1 | * | 10/2005 | Kuelbs et al. | 705/26 |
| 7,013,289 | B2 | * | 3/2006 | Horn et al. | 705/26 |
| 7,062,453 | B1 | * | 6/2006 | Clarke | 705/26 |
| 7,124,107 | B1 | * | 10/2006 | Pishevar et al. | 705/37 |
| 7,136,830 | B1 | * | 11/2006 | Kuelbs et al. | 705/27 |
| 7,143,066 | B2 | * | 11/2006 | Shear et al. | 705/54 |
| 7,210,587 | B1 | * | 5/2007 | Singer et al. | 211/55 |
| 7,284,204 | B2 | * | 10/2007 | Lee | 715/764 |
| 2001/0016821 | A1 | * | 8/2001 | DeBusk et al. | 705/2 |
| 2002/0019761 | A1 | * | 2/2002 | Lidow | 705/10 |
| 2002/0082881 | A1 | * | 6/2002 | Price et al. | 705/7 |
| 2002/0087440 | A1 | * | 7/2002 | Blair et al. | 705/29 |
| 2002/0156688 | A1 | * | 10/2002 | Horn et al. | 705/26 |
| 2002/0184084 | A1 | * | 12/2002 | Lidow | 705/10 |
| 2003/0046154 | A1 | * | 3/2003 | Larson et al. | 705/14 |

(Continued)

OTHER PUBLICATIONS

Oz Shy, Rune Stenbacka. Journal of Economic Behavior & Organization. vol. 50 (2003) 203-224. "Strategic Outsourcing".*

(Continued)

*Primary Examiner* — Romain Jeanty
*Assistant Examiner* — Gurkanwaljit Singh
(74) *Attorney, Agent, or Firm* — Buchanan Ingersoll & Rooney PC

(57) ABSTRACT

In a method of manufacturing and selling custom window coverings of the type which are made in sizes based upon dimensions provided by a customer, two sources of supply who can manufacture the same selected custom window coverings are established. The first source of supply is located closer to a point at which the custom window coverings are sold than the second source of supply. When the custom window covering is delivered by a delivery means not involving air transport, the delivery time from the first source of supply is at least one day longer than a delivery time from the second source of supply. The retailer offers each of the custom window coverings at a first price and a higher second price that is associated with an earlier delivery date. The custom window covering is made at the first source of supply if the customer selects the first price and first delivery schedule. If customer selects the second price and second delivery schedule the custom window covering is made at the second source of supply. Then the retailer delivers the custom window covering to the customer and receives payment.

20 Claims, 1 Drawing Sheet

U.S. PATENT DOCUMENTS

| | | | |
|---|---|---|---|
| 2004/0010442 A1* | 1/2004 | Merker et al. | 705/10 |
| 2004/0226662 A1* | 11/2004 | Tyner | 160/84.04 |
| 2005/0021356 A1* | 1/2005 | Thompson | 705/1 |
| 2005/0209907 A1* | 9/2005 | Williams | 705/10 |
| 2005/0240493 A1* | 10/2005 | Johnson et al. | 705/27 |
| 2005/0240524 A1* | 10/2005 | Van De Van et al. | 705/40 |
| 2005/0283406 A1* | 12/2005 | Kuelbs et al. | 705/26 |
| 2006/0136309 A1* | 6/2006 | Horn et al. | 705/26 |

OTHER PUBLICATIONS

Levy, David. Journal of International Business Studies. 1995. "International Sourcing and Supply Chain Stability".*

Berry, John. "It's Not Necessarily Curtains; Window Coverings Survive Price Drops." Washington Post. Washington, DC: Jun. 13, 2003. p. E.01, p. 1-4.*

Kamp, Jill. "Clear choice on blinds for windows." Washington Times. Washington, DC: Oct. 12, 2000. p. C.5, p. 1-3.*

"Home Depot Strengthens Wallpaper and Blinds Business." Nov. 24, 1997, HighBeam Research, PR Newswire.*

Next Day Blinds' website, http://www.nextdayblinds.com/history.asp, visited on Apr. 10, 2010.*

* cited by examiner

METHOD FOR SOURCING CUSTOM WINDOW COVERINGS FROM MULTIPLE SOURCES BASED UPON PRICE AND DELIVERY DATE

FIELD OF THE INVENTION

The invention relates to the sale of window coverings of the type in which a window covering material extends from a headrail.

BACKGROUND OF THE INVENTION

There are a variety of window coverings in which a window covering material extends from a headrail and is raised and lowered by lift cords or drawn along a track by pull cords. One type of window covering is the venetian blind in which a series of horizontal slats are hung on two or more ladders that hang from a headrail. A similar product is the vertical blind in which a set of vertical slats are suspended from a track in the headrail. Most manufacturers offer slats for venetian blinds and vertical blinds in a variety of colors and materials including wood, vinyl, aluminum and composite materials. Another class of window covering contains a panel of fabric, woven woods or woven grasses hung on a headrail. Among these window coverings are pleated shades, cellular shades, and roll-up shades. In most of these shades the fabric panel is available in a number of colors and patterns, can be woven or non-woven, and the weave can vary from sheer to tightly woven.

Traditionally, window coverings have been sold in standard sizes by department stores, discount stores and home centers. They have also been sold by custom fabricators who come to the home or office, measure the windows and make blinds to fit. In recent years some retailers have also sold custom blinds based upon measurements provided by the customer. These retailers keep a limited inventory of stock blinds in standard sizes and popular colors. If the customer does not want a blind from the retailer's current inventory, the retailer may custom order the blind from the manufacturer using the customer's measurements. Depending upon the source of supply it may take several days to several weeks for the custom blinds to arrive.

Stock blinds have a standard width and length and come in a limited number of colors and materials. In a stock blind, lift cords and tilt controls, if any, are in the same location on every blind. In a custom blind, the blind is made to have a length and width that corresponds to the size of the window opening. The customer may specify whether the lift cords and tilt control are to be on the left side or right side of the blind. The customer can often obtain a custom blind in colors not available in stock blinds. Other options may be available to the buyer of a custom blind that are not available in a standard or stock blind.

In recent years most of the standard sizes of window blinds sold through home centers and discount stores are manufactured outside the United States, most commonly in China and Mexico. While a very small amount of window coverings are made in the Orient to sizes specified by the retailer, the vast majority of blinds made overseas are stock blinds in standard sizes and a limited number of colors and materials. After the blind is made it must be shipped to the retailer or direct to the customer. Shipment is normally made by boat and truck from China and by truck from Mexico. Therefore, shipping time may consume several days or even weeks, As a result, it is quite common for a blind produced overseas to be delivered a month or more after the order has been placed. Of course one could shorten the shipping time by using air transportation, but the costs of air freight are so high as to make this option undesirable.

There are a number of custom blind fabricators throughout the United States who are quite capable of making the same window blinds as are being made in China and Mexico. Moreover, a domestic manufacturer can make any given blind in the same amount of time as the blind could be made overseas. Since these fabricators are much closer to the retailer, the time to deliver the product to the retailer or customer would be much shorter than the delivery time from Mexico or China. However, blind fabricators in the United States have higher costs and therefore must charge higher prices for the products that they make. Since nearly all the custom blinds are made in the United States and to a lesser extent in Mexico, custom blinds are sold at higher prices than stock blinds.

Many times a customer will find a stock blind that has the proper width to fit the window but is too long. That customer may choose to buy the stock blind at a lower price, and accept the fact that excess window covering material will be stacked on the window sill when the blind is fully lowered, rather than buy a custom blind with no excess window covering material at a higher price. That customer must also make a choice between getting the stock blind now or having the custom blind within a few days or weeks. Another concern is that many retailers who sell both stock blinds and custom blinds will not offer as a custom blind the same blind that is available as stock blind, and vice versa. Consequently if a customer likes a stock blind, but wants the blind made to meet his or her specifications, the retailer will tell the customer that such a custom made blind is not available. If the customer wants a custom blind he or she must select a blind having a different fabric, headrail, or bottomrail from those in the stock blind.

Most retailers know that for many products it is easier to make a sale of that product by offering a discount rather than to sell the product at standard or premium prices. A customer who has received a discount is often much happier than one who has paid the standard price. But, discounts can cut profit margin unless the discount is based upon a lower price from the manufacturer of the discounted item.

Consequently, there is a need for a method of manufacturing and selling custom window coverings that will allow the retailer to sell the same window covering product at a standard or premium price if the product is delivered quickly, and at a discount or lower price if the customer is willing to wait longer for the product.

SUMMARY OF THE INVENTION

I provide a method of selling custom window coverings of the type which are made in sizes based upon dimensions provided by a customer. First I establish two sources of supply who can manufacture the same custom window coverings in sizes based upon dimensions provided by a customer. The first source of supply is located a first distance from a point at which the custom window coverings are sold and is capable of manufacturing the custom window coverings at a first cost. The second source of supply is located a second distance from the point at which the custom window coverings are sold and is capable of manufacturing the same custom window coverings available from the first source of supply at a second cost. The first supplier is much farther away from the retailer than the second supplier and typically will be in China or Mexico. The second supplier is closer to the retailer, typically in the same geographic region of the United States as the retailer. Consequently, when the custom window covering is delivered by a delivery means not involving air transport, the delivery time from the first source of supply is at least one day more than a delivery time from the second source of supply. Since the first source of supply should have lower costs than the second source of supply, the retailer should be able to purchase the product at a lower cost from the first supplier.

The retailer offers each of the custom window coverings at a standard price and a lower second price. The lower price would typically be advertised as a discount from the standard price. Each price is associated with a delivery date or estimated delivery date. The first delivery date is available if the customer pays the standard price. The second delivery date, later than the first delivery date, is available if the customer pays the lower or discount price. The retailer obtains the custom window covering from the first, lower cost, source of supply if the customer selects the lower price and later delivery schedule. If customer selects the standard price and earlier delivery schedule, the retailer obtains the custom window covering from the second source of supply. Then the retailer delivers the custom window covering to the customer in accordance with the delivery schedule that is associated with the price selected by the customer and receives payment.

This method may be structured so that the profit margin on the discounted item is the same or greater than the profit on the same item delivered sooner. That can be done because the retailer is able to buy the same product from two sources of supply at different prices.

Other objects and advantages of my method for selling window coverings will become apparent from a description of certain present preferred embodiments thereof which are shown in the drawings.

DETAILED DESCRIPTION OF THE PREFERRED EMBODIMENTS

Figure 1:
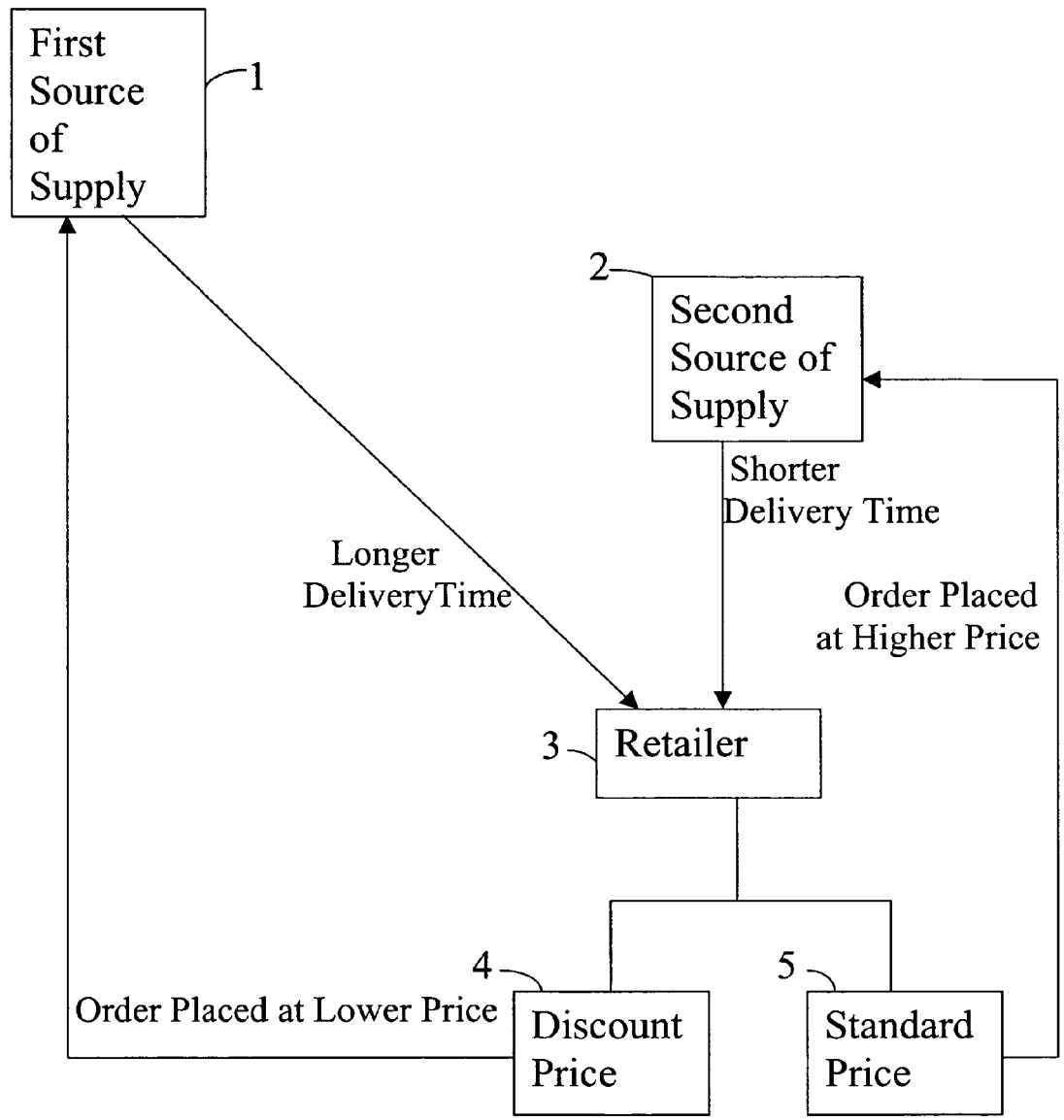
FIG. 1 is a diagram illustrating a present preferred embodiment of my method for selling custom window covering products.

In a first preferred embodiment of my method for selling window coverings illustrated by the diagram of FIG. 1, I provide two sources of supply, indicated by boxes 1 and 2. The first source of supply is located a greater distance from the retailer, indicated by box 3. Typically, that source of supply is in the Orient, most likely China, while the retailer is in the United States. The second supply source is closer to the retailer, typically in the same geographic region of the United States as the retailer. Consequently, when the custom window covering is delivered by a delivery means not involving air transport, the delivery time from the second source of supply is at least one day less than a delivery time from the first source of supply. However, the cost of the product from the second source of supply is higher than the cost of the same product from the first source of supply. Thus, the retailer can pay a lower price for the product by purchasing the product from the first supplier who is farther away from the retailer. But, the lower priced product will be delivered later.

In the drawing each source of supply is illustrated as a single box, but it should be understood that each box could represent more than one factory or fabricator. Moreover, if there are multiple manufacturing locations, those locations need not be owned or affiliated with a single company. Similarly, the retailer could have multiple locations.

The retailer offers custom window covering products at a standard or premium price and a second lower or discount price indicated by boxes 4 and 5. For all custom window coverings the customer may specify the length and width of the blind and typically other available options, such as location of lift cords. Each price is associated with a delivery schedule with the lower price being associated with a longer delivery time. Preferably, the price associated with the longer delivery time is offered as a discount from the standard price. If the customer selects the standard price and shorter delivery time, the retailer orders the item from the second source of supply at a price that likely is higher than the price from the first source of supply, since the second source of supply has higher costs. If the customer selects the lower or discount price and longer delivery time, the retailer orders the item from the first source of supply at a likely lower price. The retailer then delivers the window covering to the customer and receives payment. The retailer may require payment in advance of placing the order. The customer need not know and may not be told that each of the prices and associated delivery schedule is associated with a different source of supply.

Customers who buy custom window coverings often buy products for one or more windows in a room or building and later buy additional custom window coverings for the same room or building. Sometimes a customer wants to have some custom window coverings delivered sooner, but is willing to wait longer for the other custom window coverings. This can occur when the customer is moving into a new home and wants window coverings for the bedroom and bathroom windows as soon as possible, but is willing to wait several weeks to receive window coverings for windows in other rooms of the house. That customer may place an order for some items at standard prices and faster delivery and order other items at the discount prices and later delivery. Consequently, it is important that the same products be available from both sources of supply.

Although a retailer may offer a full line of custom window coverings he may not receive all products in the line from a single manufacturer. For example, one company may manufacture only venetian blinds while another company may make the pleated, cellular, roman and roll-up shades. In that event, the first source of supply in the present method would consist of multiple manufacturers. Similarly, the second source of supply is not limited to a single company but could be two or more fabricators. The first source of supply differs from the second source of supply in the distance of the supplier from the retailer. A second difference is that the two sources of supply have different costs, allowing the retailer to get the same product at a different price depending upon the source of supply.

While the first source of supply and the second source of supply must be able to make all of the products that the retailer offers in practicing the present method, neither source of supply nor the retailer is limited to making or selling only those window covering products. Either source of supply may make other products, or even variations of the products that are part of this program, and those other products are not part of the program. Moreover, those other products which are not part of the program may be sold to a retailer who participates in the program here disclosed, and that retailer may not sell those other products in accordance with the present method of selling custom window coverings.

Some home centers have equipment and trained personnel who can cut down the width of stock venetian blinds to correspond to the width of the window as provided by the customer. This practice is known in the industry as a cut-down program and is not considered to be fabrication of custom window blinds. That is so because the home center does not and cannot change the length of the blind, change the location of the lift cords or tilt control or offer any other options or variations from the standard blinds in stock. If the customer wants the controls on the opposite side of the blind from the location of those controls in the retailer's stock, the retailer must order the item from an outside fabricator. If only a portion of the blinds ordered require that controls be on the opposite side, then the portion of the order consisting of stock blinds and cut-down stock blinds could be filled by the retailer's own facility while the remainder of the order must be outsourced. Again, the ability of the two sources of supply to provide the same custom-made product is important for the success of the program.

Some retailers have provided space in or near their stores to vendors of products and services that are related to products sold by the retailer. Such vendors include pharmacies and automotive repair shops. Retailers have also given space to banks, floral shops and other specialty businesses as a convenience to the retailer's customers. Although no retailer or home center has yet housed a blind fabricator in or adjacent one of its stores that could occur. If that does occur, the second source of supply for my method could be the fabricator of custom window coverings at or adjacent the retailer's store. The retailer may own the fabricator. Furthermore, the retailer, first source of supply and second source of supply or any two of them may be commonly owned.

Although I have described certain present preferred embodiments of my method for selling custom window coverings, it is to be distinctly understood that my invention is not limited thereto but may be variously embodied within the scope of the following claims.

I claim:

1. A method of manufacturing and selling custom window coverings of the type which are made in sizes based upon dimensions provided by a customer comprising:
    establishing two sources of supply that manufacture custom window coverings in sizes based upon dimensions provided by a customer, wherein:
        the first source of supply is located a first distance from a point at which the custom window coverings are sold, the first source of supply being capable of manufacturing selected custom window coverings at a first cost,
        the second source of supply is located a second distance from the point at which the custom window coverings are sold, the second source of supply being capable of manufacturing the same selected custom window coverings at a second cost,
        the first distance is sufficiently greater than the second distance such that when any one of the selected custom window coverings is delivered by a delivery means not involving air transport, a delivery time from the first source of supply is at least one day more than a delivery time from the second source of supply, and
        the second cost is higher than the first cost,
    offering each of the selected custom window coverings at a standard price and a lower price and at a first delivery date available if the customer pays the standard price, and at a second delivery date, later than the first delivery date, if the customer pays the lower price;
    receiving by using a computer an order from a customer for at least one of the selected custom window coverings at the standard price and first delivery date or at the lower price and second delivery date;
    making the at least one of the selected custom window coverings at the second source of supply if the customer selects the standard price and first delivery date;
    making the at least one of the selected custom window coverings at the first source of supply if the customer selects the lower price and second delivery date; and
    delivering the at least one of the selected custom window coverings to the customer.

2. The method of claim 1 also comprising receiving payment from the customer for the at least one of the selected custom window coverings.

3. The method of claim 1 wherein the second source of supply is comprised of a plurality of factory locations.

4. The method of claim 3 wherein at least two of the plurality of factory locations are owned by different owners.

5. The method of claim 3 wherein at least two of the plurality of factory locations manufacture different ones of the selected custom window covering products.

6. The method of claim 1 wherein the first source of supply is comprised of a plurality of factory locations.

7. The method of claim 6 wherein at least two of the plurality of factory locations are owned by different owners.

8. The method of claim 6 wherein at least two of the plurality of factory locations manufacture different ones of the selected custom window covering products.

9. The method of claim 1 wherein the second source of supply and the point at which the custom window coverings are sold are located in the United States and the first source of supply is located in China or Mexico.

10. The method of claim 1 wherein the first source of supply and the point at which the custom window coverings are sold are commonly owned.

11. The method of claim 1 wherein the second source of supply is a facility at a store location of a retailer.

12. The method of claim 1 wherein the point at which the custom window coverings are sold is a retail store or a home center.

13. A method of manufacturing and selling custom window coverings of the type which are made in sizes based upon dimensions provided by a customer comprising:
    establishing two sources of supply that manufacture custom window coverings in sizes based upon dimensions provided by a customer, wherein:
        the first source of supply is located a first distance from a point at which the custom window coverings are sold, the first source of supply being capable of manufacturing selected custom window coverings at a first cost,
        the second source of supply is located a second distance from the point at which the custom window coverings are sold, the second source of supply being capable of manufacturing the same selected custom window coverings at a second cost,
        the first distance is sufficiently greater than the second distance such that when any one of the selected custom window coverings is delivered by a delivery means not involving air transport, a delivery time from the first source of supply is at least one day longer than a delivery time from the second source of supply, and
        the second cost is different from the first cost,
    offering each of the selected custom window coverings at a first price and a second price different from the first price and at a first delivery date available if the customer pays the first price, and at a second delivery date, later than the first delivery date, if the customer pays the second price;

receiving by using a computer an order from a customer for at least one of the selected custom window coverings at the first price and first delivery date or at the second price and second delivery date;

making the at least one of the selected custom window coverings at the first source of supply if the customer selects the first price and first delivery date;

making the at least one of the selected custom window coverings at the second source of supply if the customer selects the second price and second delivery date; and delivering the at least one of the selected custom window coverings to the customer.

14. The method of claim 13 also comprising receiving payment from the customer for the at least one of the selected custom window coverings.

15. The method of claim 13 wherein the second source of supply is comprised of a plurality of factory locations.

16. The method of claim 15 wherein at least two of the plurality of factory locations are owned by different owners.

17. The method of claim 15 wherein at least two of the plurality of factory locations manufacture different ones of the selected custom window covering products.

18. The method of claim 13 wherein the first source of supply is comprised of a plurality of factory locations.

19. The method of claim 18 wherein at least two of the plurality of factory locations are owned by different owners.

20. The method of claim 18 wherein at least two of the plurality of factory locations manufacture different ones of the selected custom window covering products.

* * * * *